US005179062A

United States Patent [19]

Dufour

[11] Patent Number: 5,179,062
[45] Date of Patent: Jan. 12, 1993

[54] PROCESS FOR THE PRODUCTION OF HIGHLY PERMEABLE CALCINED DIATOMITES WITH LOW CRISTOBALITE CONTENT AND RESULTANT CALCINED DIATOMACEOUS FILTRATION AGENTS

[76] Inventor: Pascal Dufour, 290 Avenue d'Argenteuil, 92600 Asnieres/Seine, France

[21] Appl. No.: 712,069

[22] Filed: Jun. 7, 1991

[30] Foreign Application Priority Data

Jun. 20, 1990 [FR] France ............................. 90 07690

[51] Int. Cl.[5] .............................................. B01J 20/14
[52] U.S. Cl. .................................... 502/412; 423/326
[58] Field of Search ..................... 502/412; 55/523; 423/326

[56] References Cited

U.S. PATENT DOCUMENTS

| 1,862,825 | 6/1932 | Laury | 502/247 |
| 1,985,526 | 12/1934 | Stockton | 502/412 |
| 2,470,346 | 5/1949 | Frankenhoff | 502/412 |
| 3,012,981 | 12/1961 | Riede | 502/412 |
| 3,993,499 | 11/1976 | Jacobson et al. | 423/111 |
| 4,112,129 | 9/1978 | Duensing et al. | 502/410 |
| 4,325,844 | 4/1982 | Olmsted, Jr. | 502/412 |
| 5,073,178 | 12/1991 | Mimoki et al. | 55/524 |

FOREIGN PATENT DOCUMENTS

| 62120 | 8/1986 | Australia | 502/412 |
| 266034 | 3/1989 | German Democratic Rep. . | |

*Primary Examiner*—Anthony McFarlane

[57] ABSTRACT

A process for the production of calcined diatomaceous filtration agents having a cristobalite content lower than 1% and a 50-μm screen retention rate lower than 5% by rapid calcination of diatomites, comprising injecting the diatomite into a high-temperature gaseous stream and during its residence in the gaseous stream maintaining the diatomite between about 1250° and 850° C. for a period of time between several tens of milliseconds and several seconds, and calcined diatomaceous filtration agents having a permeability between 0.06 and 0.4 darcy and a cristobalite content lower than 1%.

10 Claims, No Drawings

PROCESS FOR THE PRODUCTION OF HIGHLY PERMEABLE CALCINED DIATOMITES WITH LOW CRISTOBALITE CONTENT AND RESULTANT CALCINED DIATOMACEOUS FILTRATION AGENTS

BACKGROUND OF THE INVENTION

The present invention pertains to a new procedure for producing filtration agents by calcination of diatomites in a circulated bed furnace, by means of which it is possible to control the agglomeration of the diatomaceous particles and the cristobalite content of the finished product.

Diatomites are sedimentary rocks that result from the accumulation over geological epochs, notably the tertiary era and the quaternary era, of the fossilized remains of diatoms. Diatoms are unicellular algae that developed, and still develop in modern times, in lakes, rivers and oceans. Their protective envelopes have a siliceous framework of very variable form, resembling that of rosettes, combs, mats, muffs, etc., but always with alveoli and extremely fine channels. Diatomites are thus siliceous rocks of very low density and with a specific surface area ranging from 1 to 40 m$^2$/g. Because of these very specific characteristics, numerous industrial applications have been developed for diatomites for many years, notably as filtration agents, fine fillers for paints, catalytic supports, etc.

Diatomites constitute a mineral which is extracted from their natural deposits and then must be transformed into industrial products. The ore undergoes various preliminary treatments: crushing, drying, grinding and elimination of large impurities (basalt, clays, sand, etc.). It is then subjected to the important calcination treatment, the purpose of which is to diminish the moisture content from 60% to circa 1%, burn the organic materials that it contains, and to transform into oxides, silicates or aluminosilicates certain undesirable mineral compounds that ordinarily accompany the silica such as calcium carbonate, calcium sulfate, iron derivatives and possibly sulfides.

When filtration agents are being produced, special attention must be directed to the permeability which is obviously an essential characteristic of this type of product. This permeability is usually measured in darcys, with the darcy being the permeability of a porous bed 1 cm high and with a 1 cm$^2$ section through which flows a fluid with a viscosity of 1 mPa.s (or 1 centipoise) with a flow rate of 1 cm$^3$/second under an applied pressure differential of 1 atmosphere; one darcy is 0.987 10$^{-12}$m$^2$, i.e., more or less 1 pm$^2$. Industrial filtration agents, also referred to as filter aids, generally have permeabilities between 20 millidarcys and 15 darcys, notably higher than those of the diatomites which are the raw materials. Calcination of diatomites for the production of filtration agents therefore also has the goal of agglomerating the diatoms and their fragments of several micrometers in length into aggregates of 10 μm or more, so as to reduce the content of fines and to increase the permeability. Obviously, this is a partial agglomeration which must be managed so as to avoid complete fusion of the diatomaceous skeletons and formation of aggregates of a size greater than 50 μm which have the serious drawback of decanting or depositing in the low points of the pipes or filters during filtration operations. It is also appropriate during this treatment phase to prevent occurrence of crystallization of the amorphous silica which is the essential contituent of diatomite. Thus, the technical problem to be resolved is the production of filtration agents by means of a diatomite calcination operation that destroys its natural impurities, develops a correct permeability in the calcined diatoms while maintaining their degree of crystallinity (cristobalite, quartz or tridymite) at a very low level.

It has actually been determined (Kadey, 1975; Deer, 1966) that when diatomaceous earths contained, depending on the deposits, less than 1% cristobalite, their calcination induced the appearance of cristobalite and to a lesser degree of tridymite by thermal conversion of the amorphous silica that is the essential constituent of the diatoms' skeleton. The content of cristobalite in the products obtained by simple calcination ranges from 1 to 100%, depending on the raw material and the temperature; it reaches 40 to 80% in so-called white filtration agents, derived from calcination in the presence of fluxes such as sodium carbonate. It is known that the inhalation of crystalline silica dust can induce silicosis, a serious pulmonary disease. A monograph by the Internal Agency for Research on Cancer (IARC) "Evaluation of carcinogenic risks of chemicals to humans, Silica and some silicates", Volume 42, 1987 even implicated crystalline silica as a potential carcinogen. This opinion is highly controversial, but, no matter what the outcome might be and even though the very complex regulations governing the work considtions of personnel exposed to the risks of inhaling crystalline silica dust are strictly applied, the limiting of the crystalline silica content of diatomaceous filtration agents supplied to the agricultural-alimentary industry remains a noteworthy concern of the manufacturers. The fine cristobalite content is between 1 and 100% in the products obtained in accordance with the prior art.

In fact, in these conventional procedures for manufacturing filtration agents, a calciner temperature between 900° and 1200° C. is indispensable for inducing the agglomeration required to obtain a range of filtration agents with permeabilities between 20 millidarcys and 15 darcys. Now, with raw materials rich in iron, sodium and calcium, the surface fusions obviously promoted the desired agglomeration but they also trigger rapid crystallization of the silica into cristobalite. This crystallization remains at a low level below 850° C. but increases very quickly above 900° C. It is estimated that the critical level of impurities catalyzing this crystalline transformation is on the order of 1%.

In the old conventional procedures in which the high-temperature residency times are necessary, greater than several seconds or even several minutes, the massive formation of cristobalite is not avoided. It is true, however, that the primary concern was the physical properties of the finished products. Previously, the heat treatment of diatoms was performed by putting them on horizontal trays on which they were calcined. The product was moved from the top trays towards the bottom trays by rabble arms made of refractory cast iron. The low productivity of this system and its high maintenance cost led industrialists to prefer rotary calcination furnaces. These rotary furnaces are generally very long (30 meters or more) and operate at temperatures between 1000° and 1200° C. (see for example Diatomaceous Earth, William Q. Hull, in Industrial and Engineering Chemistry, February 1953, pp. 258–269). The operation must be controlled with the greatest possible precision in order to avoid densification of the silica and destruction of its arachnean structure with which its industrial properties are linked.

The manufacturers have good control of this rotary furnace calcination technology. Nevertheless, the technique involves mass calcination in the presence of a flame with extremely irregular heat transmission, resulting in the fact that not all of the diatoms receive the same heat treatment. If it is desired that the heat treatment operate in the entire mass at a minimum set temperature and for a period of time that is sufficient to achieve the desired agglomeration, it is necessary to accept the fact that a portion of this mass has been subjected to surface overcalcination. This surface fusion is desirable for achieving agglomeration but must be managed so as to limit to the extent possible the destruction of the fine structure of the diatoms and the crystallization of the silica. If not, these damaged diatoms that have become excessively agglomerated hard silica particles must be ground, which unfactorably increases the "cake density" of the final product. This "cake density" is an important characteristic of filtration agents; it is the dry apparent density of the filtration agent bed that remains on a Büchner filter after filtration of a liquid in which the said filtration agent was previously suspended. It is estimated that a "cake density" greater than 0.45 g/cm$^3$ corresponds to products that are too fused or too ground and that have lost the characteristic porous structure required for good quality filtration agents. Grinding increases the content of fines, the excessive lightness of which will be a source of filter clogging and a cause of undesirable clouding of the filtered liquids. This content of fines must be diminished by difficult, costly postreatments.

For a given raw material, the final characteristics of the calcined product, notably its permeability and 50-$\mu$m residue rate, are strongly influenced by the selection of the calcination temperature and by the residency time of the diatoms in the furnace. The presence of a 50-$\mu$m residue, which is standard for the products produced by the calcination procedures in accordance with the prior art, requires the manufacturer to break and grind these products when they come out of the furnace. This is a very heavy industrial constraint. In addition, grinding presents the drawback of lacking selectivity. Although it reduces the dimensions of the large agglomerates, it also reduces the dimensions of the independent diatoms, thereby resulting in an undesirable increase in the content of fines and in the "cake density" of the finished products. With the traditional rotary furnace calcination procedures or the old calcination procedures, notably upright furnaces with superimposed trays or so-called fluidized bed furnaces, which are calcination techniques in which the minimum residency time is on the order of several minutes, it is not possible to control this agglomeration and these procedures always turn out calcined products with a 50-$\mu$m screen residue greater than 5% as soon as the calcination temperature exceeds 950° C.

More improved procedures, such as those described in French Patent No. 2,586,588 or East German Patent DD 266,034, have employed turbulent bed furnaces, the geometry of which is such that the hot gases carry the diatomite in spiral streams. In this system, there is better control of the overall residency time of the diatomite in the gaseous stream, but it is not possible to manage either the thermal history of the diatomaceous particles or the resultant agglomeration, such that in practice the granulometry of the diatomite to be treated is determinant, which is not necessarily the granulometry that it is desired to obtain.

SUMMARY OF THE INVENTION

It has now been discovered that all of these drawbacks can be avoided and that it is possible to attain the desired qualities for diatomaceous filtration agents by carrying out calcination of diatomite in a gaseous stream at high temperature, subjecting it to residency at very high temperature for a short period of time, the order of magnitude of which is from several tens of milliseconds to several seconds, and that during this period the exposure is sufficient to produce a satisfactory agglomeration without really triggering the crystallization of the silica, and that the continuation of the residency in the gaseous stream at a temperature that has dropped down to below circa 850° C. makes it possible to complete the elimination of the organic sulfurous impurities and the rendering insoluble of the metallic impurities without perceptibly modifying its permeability and its crystallinity.

Thus, the object of the present invention is a procedure for producing calcined diatomaceous filtration agents (specifying here that the term "calcined diatomaceous filtration agents" is understood to mean products obtains by means of simple calcination, i.e., without fluxes, which the expert in the field often refers to as "pink" filtration agents, because the dominant color of these products is essentially pink, although salmon-colored or even white products are sometimes found; this is in contrast to what are referred to as "white" or "activated" filtration agents which are obtained in the presence of fluxes, sodium carbonate in particular, and the fine structure of which is profoundly changed) by rapid calcination of diatomites, filtration agents with a critobalite content lower than 1%, and the 50-$\mu$m screen residue rate of 5% which is attained without grinding after calcination, characterized in that the diatomite is injected into a gaseous stream at high temperature, and that during its residency in the gaseous stream, its period of exposure between circa 1250° C. and circa 850° C. is limited to a duration between several tens of milliseconds and several seconds.

DETAILED DESCRIPTION

In a preferred form of the invention, there is created in any conventional cylindrical furnace with a vertical axis a gaseous stream carried in a helicoidal movement generated by the injection of hot gas through slits equipped with inclined vanes, installed in the bottom of the furnace. The furnace is charged in advance with refractory spheres (balls), and the hot gas impelled at high speed communicates to the balls a component of vertical velocity that equilibrates their weight (levitation) and a transverse component (horizontal movement of the bed). Under these conditions, the refractory balls remain confined in a torus through which they travel with a helicoidal movement. The diatomaceous particles injected into the gaseous stream, preferably below the levitating torus, remain for an instant in this permanent bed of levitating incandescent balls with which they enter into thermal equilibrium, and where they engage in mutual collisions in the free spaces left open by the balls. Thus, there is realized the process of their rapid calcination and agglomeration. They then escape the bed of balls, following the helicoidal movement of the gaseous stream, a trip of several seconds during which their calcination is completed at high temperatures which are nevertheless lower than 850° C. Carried along by the gaseous flow, they are quickly discharged from the furnace and extracted by passage through a cyclone and filtration.

Depending on the conditions of implementaion, it is estimated that the residency time of the diatomaceous particles in the high-temperature gaseous stream is on the order of magnitude between several tens of milliseconds and several seconds. With regard to the levitating silica balls, they continue to rotate as a unit which considerably limits their abrasion. These balls are preferably made of porous silica or alumina; their diameter is selected so as to be between one and several millimeters.

The procedure in accordance with the present invention has the advantage of producing a calcined filtration agent the 50-μm screen retention level of which is close to that the feed material, i.e., lower than 5%, for permeability values between 20 millidarcys and 15 darcys. A consequence of the first advantage is the elimination of the grinding step, a delicate step which was necessary in their conventional calcination procedures. The cristobalite content of filtration agents obtained in accordance with the procedure is below 1%. With certain diatomaceous rocks with a sufficiently low level of chemical impurities, the content of cristobalite, quartz or tridymite can even be zero.

The following examples will provide further comprehension of the invention with limiting the same.

In these examples, the permeability was measured in accordance with the method presented in French Patent No. 2,367,282.

The 50-μm retention was measured by placing 10 g of powder on a 50-μm screen in accordance with the standard DIN 4188, and washing with ordinary water until there passes through a clear water free from filtration agent. The product remaining on the filter is washed, dried, weighed and the weight value found is related to 100 g of powder.

The loss on ignition (LOI) is the loss in weight of a sample calcined at 900° C. for 1 hour.

Cristobalite was quantitatively determined on the basis of its X-ray diffraction pattern.

The particle size is a weight-equivalent mean diameter.

The iron EBC is the amount of iron extractable with a solution of potassium phthalate acid in accordance with the international standard Analytica EBC - 9.5 soluble iron, D 98 (F 97). See also Analytica EBV - 7.8 quantitative determination of iron in beer, D 66 (F 66).

EXAMPLE 1

The apparatus employed here is a special furnace developed by Torftech Limited, then Davy McKee. It is not strictly speaking a fluidized or circulated bed system, but rather a system with a bed of a specific substance in the form of a compact turbulent band. The system is described in European Patent No. 0068853. It is comprised of a revolving enclosure with a vertical axis 40 cm in diameter, in which flue gas or just simply air heated to 1200° C. is injected via slots and refractory ceramic slats inclined in such a manner that the movement of the gas in the furnace is helicoidal. The furnace is equipped with two cyclones in series and a filter.

The gas flow rate is 400 m³/hour TPN and the gas velocity at the level of the refractory ceramic slats is 50 m.s$^{-1}$. The residency time of the diatomaceous material in the high-temperature gaseous stream is estimated to be several milliseconds.

Before being started up, the furnace is charged with 500 grams of refractory silica balls, with a diameter of 2 mm. When the movements of the gaseous stream and the levitating bed of refractory balls have attained their operating state, the diatoms are introduced in a continuous manner at the rate of 25 kg/hour between the level of the refractory ceramic slats and the level of the levitating bed of balls thereabove; the feeding operation is facilitated at this level by the internal depression at this site.

The raw material employed is kieselguhr with the following characteristics measured before purification:

| | |
|---|---|
| Permeability | $\beta = 0.020$ darcy |
| Filtration cake density | $Dc = 0.4$ g/cm³ |
| 50-μm screen retention | $R_{50} = 0\%$ |
| Loss on ignition | $LOI = 9\%$ |
| Odor | None |
| Nitrogen BET surface | $\Sigma = 35$ m²/g |
| Color | White or green |
| Cristobalite content | <0.25% |
| Chemical analysis before loss on ignition: | |
| $SiO_2 =$ | 84.5% |
| $Al_2O_3 =$ | 3.1% |
| $Fe_2O_3 =$ | 2.4% |
| $CaO =$ | 0.95% |
| $Na_2O =$ | 0.08% |
| $MgO =$ | 0.08% |
| $K_2O =$ | 0.03% |
| Carbon = | 1.93% |
| Organic sulfur = | 0.9% |
| Total sulfur = | 1.2% |

A calcined product was collected under the cyclones and was not subjected to grinding (this is one of the characteristics of the products in accordance with the invention); the characteristics of the product were as follows:

| | |
|---|---|
| Permeability | $\beta = 0.15$ darcy |
| Filtration cake density | $Dc = 0.360$ g/cm³ |
| 50-μm screen retention | $R_{50} = 0\%$ |
| Mean particle size | 15 μm |
| Loss on ignition | $LOI = 1\%$ |
| Odor | None |
| Nitrogen BET surface | $\Sigma = 11$ m²/g |
| Color | Pink |
| Carbon + organic sulfur | =0% |
| Iron (EBC) | =0.013% |
| Cristobalite content | ≦1% |

With the same temperature, but under the conditions of conventional calcination in an industrial rotating furnace, a product was obtained that had to be reground in order to present the following typical characteristics:

| | |
|---|---|
| Permeability | $\beta = 0.165$ darcy |
| Filtration cake density | $Dc = 0.350$ g/cm³ |
| 50-μm screen retention | $R_{50} = 7\%$ |
| Mean particle size | 20 μm |
| Loss on ignition | $LOI = 0.5\%$ |
| Odor | None |
| Nitrogen BET surface | $\Sigma = 4$ m²/g |
| Color | Pink |
| Carbon + organic sulfur | =0% |
| Iron (EBC) | =0.0115% |
| Cristobalite content | ≈50% |

The product in the state in which it was recovered from the cyclone would not have been usable as a filtration agent without regrinding. Despite everything, it exhibit a high 50-μm retention rate.

EXAMPLE 2

The same raw material and apparatus as in Example 1 were employed but the calcination temperature was lower (1060° C.). The product collected did not require regrinding after calcination and had the following characteristics:

| Permeability | $\beta = 0.112$ darcy |
| --- | --- |
| Filtration cake density | Dc = 0.365 g/cm$^3$ |
| 50-μm screen retention | $R_{50} = 0\%$ |
| Mean particle size | 18 μm |
| Loss on ignition | LOI = 2.8% |
| Odor | None |
| Nitrogen BET surface | $\Sigma = 29$ m$^2$/g |
| Color | Pink |
| Carbon + organic sulfur | =0% |
| Iron (EBC) | =0.015% |
| Cristobalite content | <0.25% |

The high loss on ignition of 2.8% represents the constitutent water of the clays, the presence of which is not harmful to the quality of the filtration agent. The totality of the carbon and organic sulfur matter was eliminated.

Using a conventional furnace at the same temperature of 1060° C., the resultant product had to be reground in order to exhibit the following characteristics:

| Permeability | $\beta = 0.065$ darcy |
| --- | --- |
| Filtration cake density | Dc = 0.3350 g/cm$^3$ |
| 50-μm screen retention | $R_{50} = 3\%$ |
| Mean particle size | 20 μm |
| Loss on ignition | LOI = 0.5% |
| Odor | None |
| Nitrogen BET surface | $\Sigma = 6$ m$^2$/g |
| Color | Pink |
| Carbon + organic sulfur | =0% |
| Iron (EBC) | =0.0135% |
| Cristobalite content | ≈50% |

EXAMPLE 3

The test conditions in this example were the same as in Example 1 with, however, one important change: the silica balls were not added to the furnace. The residency time of the diatoms in the heated zone, taking into account the velocity of the gaseous flow, was estimated to be 2 milliseconds.

The product obtained had the following characteristics:

| Permeability | $\beta = 0.029$ darcy |
| --- | --- |
| Filtration cake density | Dc = 0.335 g/cm$^3$ |
| 50-μm screen retention | $R_{50} = 3\%$ |
| Mean particle size | 20 μm |
| Loss on ignition | LOI = 7% |
| Odor | None |
| Nitrogen BET surface | $\Sigma = 35$ m$^2$/g |
| Color | White |
| Carbon | =1.6% |
| Organic sulfur | =0.7% |
| Iron (EBC) | =0.0135% |
| Cristobalite content | <1% |

This example demonstrates the value of the bed of balls for attaining the level of agglomeration required for the development of good permeability. It should be noted that the system employed here has been proposed for the expansion of rhyolite into perlite (perlite is also employed as a filtration agent) or for the expansion of mica into expanded vermiculite. The presence of the balls is not necessary because of the grain size larger than 160 μm and the high density of these materials. The movement of the perlite or vermiculite formed in this manner is greatly facilitated by the difference in density before and after calcination and the silica balls, if they had been employed, would not have played any role in the regulation of the residence time, since the residence time was determined by the high weight of the grains of rhyolite or mica in equilibrium with the gaseous flow.

EXAMPLE 4

This example illustrates the difficulty encountered when activating diatoms in the vertical tube furnaces normally employed for the expansion of perlite. The installation employed in this example is comprised of a burner mounted on a cylindrical tube and a cyclone collector. A lateral input is provided in the cylindrical tube at the level of the flame for introduction of the diatoms. The temperature of the exhaust gas is 900° C. but the flame reaches 1700° C.

Use was made of the same diatomite as in Example 1. After passage through the flame, a product was recovered with the following characteristics:

| Permeability | $\beta = 0.051$ darcy |
| --- | --- |
| Filtration cake density | Dc = 0.257 g/cm$^3$ |
| 50-μm screen retention | $R_{50} = 8\%$ |
| Mean particle size | 22 μm |
| Loss on ignition | LOI = 3% |
| Odor | None |
| Nitrogen BET surface | $\Sigma = 35$ m$^2$/g |
| Color | Gray |
| Carbon | =1.6% |
| Organic sulfur | =0.7% |
| Iron (EBC) | =0.0135% |
| Cristobalite content | <0.1% |

The diatoms were not sufficiently calcined to be acceptable as a filtration agent and their excessively fast passage prevented total destruction of the organic matter. The gray rather than pink color of the product indicates that the calcination of the organic matter was also insufficient or that there is an accretion of carbon. The product obtained is a mixture of calcined and uncalcined diatoms because of the temperature gradients and the nonhomogeneous movement of the diatoms in the tube.

EXAMPLE 5

Here we describe the results of diatom calcination in a fluidized bed. This technique should not be considered to a flash calcination technique. The fluidized bed furnace employed here is a pilot-scale furnace constituted of a 3-meter high refractory steel tube with a diameter of 0.105 m. The hot gas distributor at the base of the fluidized bed is comprised of stainless steel balls with a diameter of 3 mm. Above this distributor, the height of the bed of diatoms is circa 10 cm. The diatoms are fed into the furnace at the rate of 0.6 kg per hour and have a mean residence time of 4 minutes in the fluidized bed. The velocity of the vertical movement of the agglomerated diatoms is estimated to be 0.2 m/s. Five percent of the product was recovered in the cyclone in the form of blow-off; the remaining 95% was collected at the outlet.

The characteristics of the product calcined at 100° C. were:

| | |
|---|---|
| Permeability | $\beta = 0.097$ darcy |
| Filtration cake density | $Dc = 0.230$ g/cm$^3$ |
| 50-μm screen retention | $R_{50} = 19\%$ |
| Loss on ignition at 900° C. 1 hour | $LOI = 0.5\%$ |
| Carbon + organic sulfur | $= 0\%$ |
| Color | Pink |
| Cristobalite content | $\approx 12\%$ |
| Mean particle size | 18 μm |

The figure of 19% 50-μm screen retention demonstrates how difficult it is to obtain controlled agglomeration under these conditions. In contrast, the cristobalite content is normally high, taking into account the raw material employed and its long residency time in the heated zone.

These examples have shown the possibility of obtaining a very specific category of calcined diatomaceous filtration agents, that of filtration agents which are very permeable, with a permeability between circa 0.06 and 0.4 darcy, and with a cristobalite content below 1%. This category of filtration agents has been unknown until now because of the low-temperature calcination that preserves the amorphous silica and is only applied to certain relatively pure diatomites, is not capable of increasing their natural permeability.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for the production of calcined diatomaceous filtration agents having a cristobalite content lower than 1% and a 50-μm screen retention rate lower than 5% by rapid calcination of diatomites, comprising injecting the diatomite into a high-temperature gaseous stream and during its residence in the gaseous stream maintaining the diatomite between about 1250° and 850° C. for a period of time between several tens of milliseconds and several seconds.

2. The process of claim 1 wherein said high-temperature gaseous stream injected with said diatomite also supports a material in levitation.

3. The process of claim 2 wherein said high-temperature gaseous stream is in a furnace in which said gaseous stream has an ascending helicoidal path and in which said levitating material is not transported in an ascending helicoidal path by said gas stream and remains in levitation in an annular zone.

4. The process of claim 3, wherein said diatomite is injected into said gaseous stream below said annular zone of said levitating material.

5. The process of claim 4 wherein the residence time of the diatomite in the part of said gaseous stream supporting said material in levitation is between several tens of milliseconds and several seconds.

6. The process of any one of claims 2 to 5, wherein said levitating material is composed of refractory spheres.

7. The process of any one of claims 1 to 5, wherein there is no subsequent grinding of said filtration agents to obtain a 50-μm screen retention rate lower than 5%.

8. The process of any one of claims 1 to 5, wherein said diatomites injected into said gaseous stream have a level of impurities higher than 0.05%, which impurities consist of alkali metal or alkaline-earth metal salts or oxides, of aluminum and iron.

9. The process of any one of claims 1 to 5, wherein the gas in said gaseous stream is air or flue gas containing oxygen.

10. A calcined diatomaceous filtration agent having a permeability between 0.06 and 0.4 darcy and a cristobalite content lower than 1%.

* * * * *